Feb. 23, 1932.    L. E. SMITH ET AL    1,846,442
CENTER CLEARER FOR ROOT CROP HARVESTERS
Filed Jan. 14, 1931    2 Sheets-Sheet 1
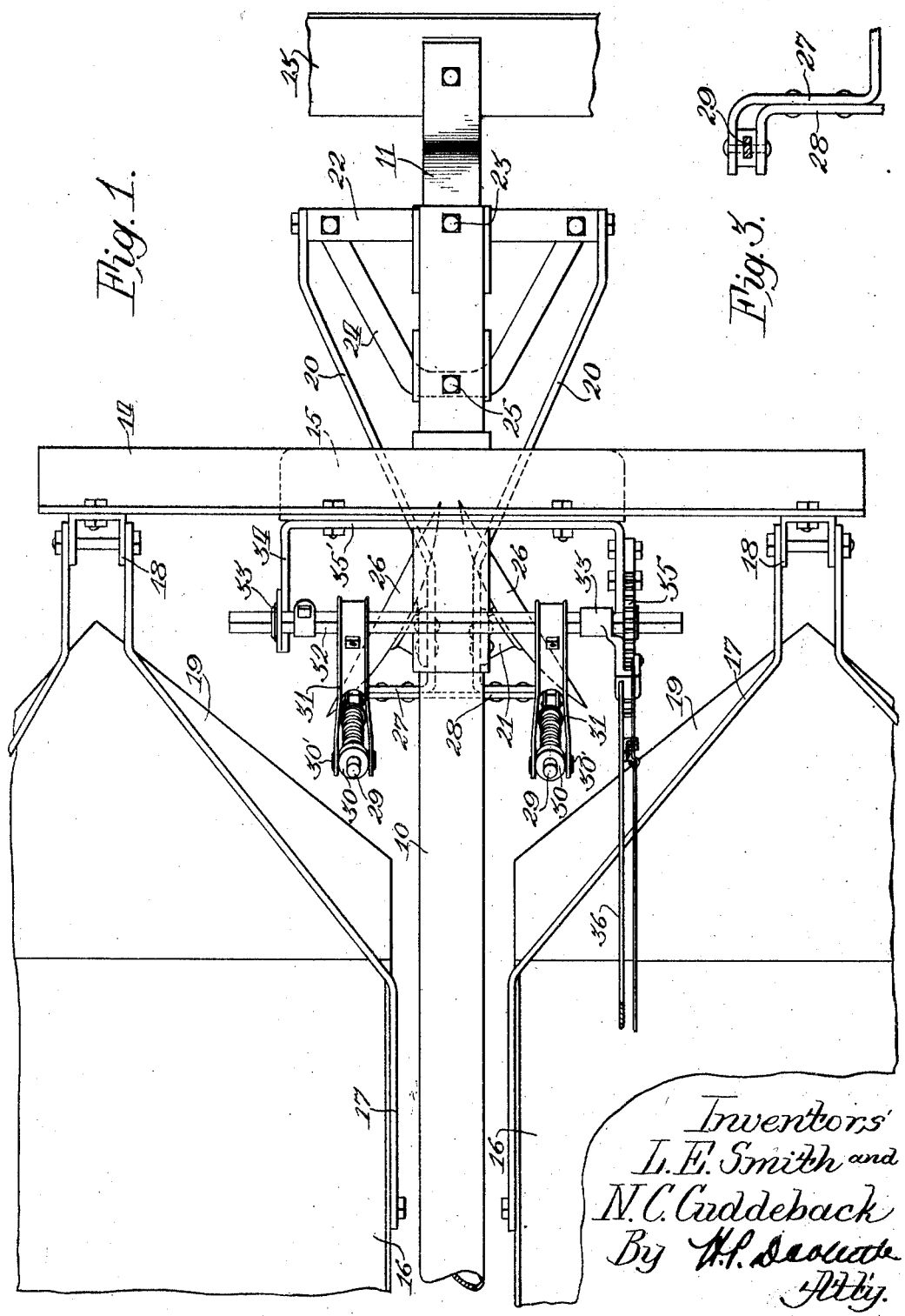
Inventors
L. E. Smith and
N. C. Cuddeback

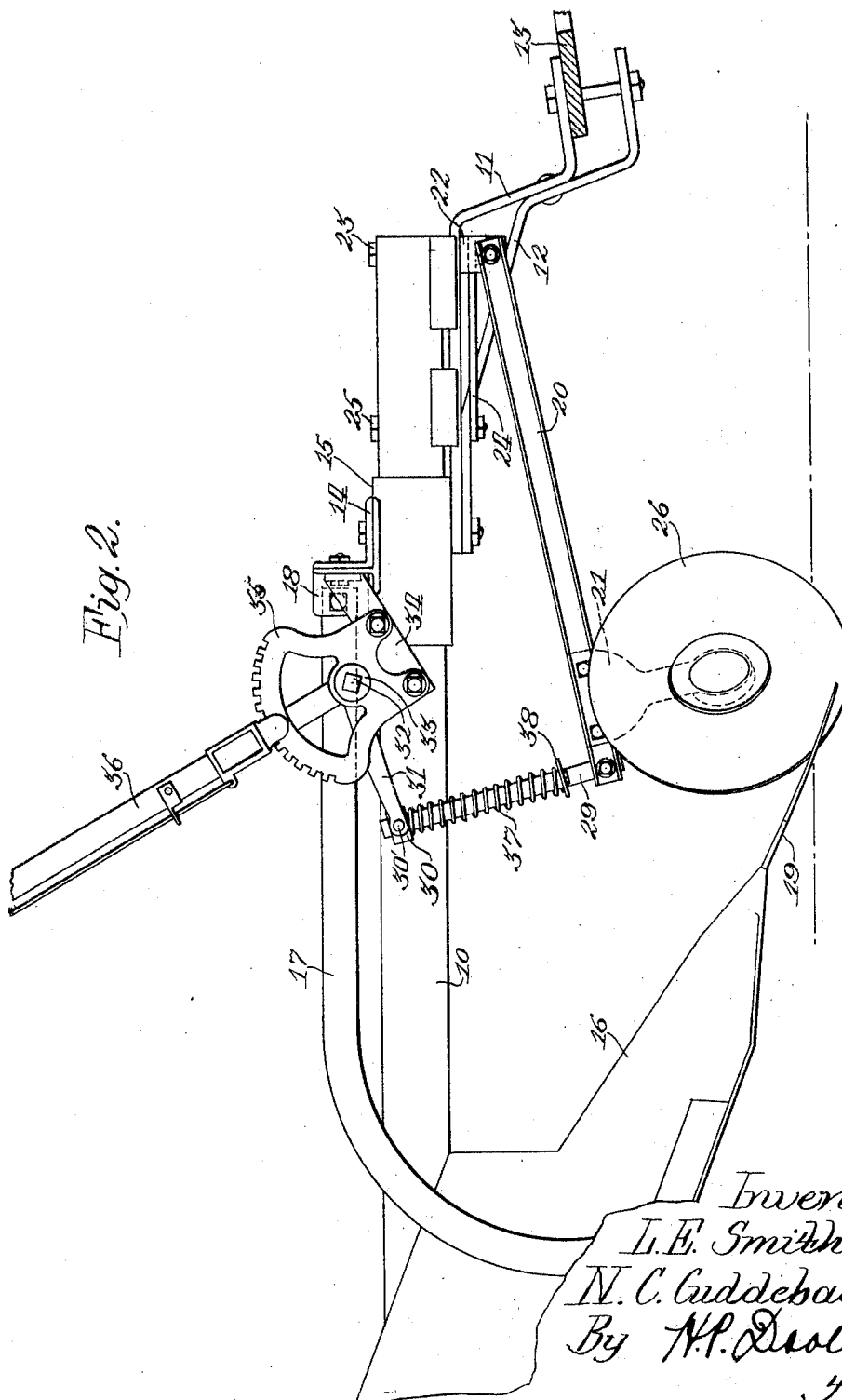

Patented Feb. 23, 1932

1,846,442

UNITED STATES PATENT OFFICE

LEWIS E. SMITH AND NELSON C. CUDDEBACK, OF AUBURN, NEW YORK, ASSIGNORS TO INTERNATIONAL HARVESTER COMPANY, A CORPORATION OF NEW JERSEY

CENTER CLEARER FOR ROOT CROP HARVESTERS

Application filed January 14, 1931. Serial No. 508,733.

This invention relates to a potato digger.

More specifically, it releates to a trash clearing device, adapted to be mounted on a multiple row potato digger.

The principal object of the invention is to provide means for preventing the accumulation of material, such as weeds, potato vines, and other trash between the digging units of a multiple row potato digger.

This and other more specific objects which will be apparent, are accomplished by a construction such as illustrated in the drawings, in which:

Figure 1 is a plan view showing a portion of the supporting frame of a multiple row potato digger with the digging units attached thereto, to which the device of the invention is attached;

Figure 2 is a side elevation of the same structure shown in Figure 1; and

Figure 3 is an enlarged detail showing the means by which lifting means are attached to the center clearing device.

Only such parts of the frame of the digger and the digger units are shown as are necessary to illustrate the functioning of the device comprising the invention. Although the device of the invention may be embodied in any multiple row digger, the drawings illustrate a digger of a construction such as shown in detail in the co-pending application, Serial No. 514,422 filed Feb. 9, 1931.

The supporting frame of the digger includes a tubular member 10, provided at its forward end with means consisting of bars 11 and 12, shaped to form a clevis for attaching the digger to the drawbar 13 of a tractor. A transverse angle bar 14 is rigidly secured to a casting 15, mounted on the tubular member 10. The digger units 16 are provided at their forward ends with draft members 17, which are bent inwardly toward the center of the units and are pivotally secured to brackets 18, secured to the ends of the bar 14. The digger units 16 are provided at their forward ends with the usual soil engaging shovels 19.

The center clearing device is mounted between the shovels 19, substantially in line with the points of said shovels. A pair of bars 20 and a casting 21 to which the bars are rigidly secured, make up the supporting frame of the center clearing unit. The bars 20 extend forwardly and are bent outwardly. Longitudinal portions at the forward ends of said bars are pivotally attached to the bent down ends of a tranverse bar 22. The bar 22 is rigidly secured to the frame structure of the digger by a bolt 23, extending through the center of the bar and through the tubular member 10, and by a bar shaped bracing member 24. The member 24 is attached at its center by a bolt 25 to the member 10 and at its ends is attached to the outer ends of the bar 22.

The casting 21 has a downwardly extending portion, indicated in dotted lines in Figure 2, on which bearing means, shown in Figure 1, are provided for rotatively attaching disks 26. The disks are positioned at an opposite angle with respect to the line of draft with their forward edges adjacent each other. The bars 20 extend rearwardly from the casting 21 and are provided with laterally extending portions 27, to which a bar 28 is attached. The end portions of said bars are bent at right angles in spaced relationship, as shown in Figure 3, to provide means for pivotally attaching a depth adjusting link 29. Each of the links 29 extends slidably through an opening in a member 30, which is provided with trunnions 30'. The trunnions 30' are pivotally mounted at the end of a lever arm 31. The lever arms 31 are rigidly secured to a rock shaft 32, extending transversely across the digger frame. At one end of the shaft 32 a bearing 33 is provided, said bearing being supported by a rearward extension 34 from a bar 35', rigidly secured to the frame structure of the digger. At the other end of the shaft 32 the bearing support is of a similar nature and includes a quadrant 35. An adjusting lever 36 is secured to the shaft 32, adjacent the quadrant 35, and is provided with a latch means for engaging the quadrant and locking the rockshaft in a plurality of positions. Springs 37 are mounted around the links 29, abutting against the underside of the members 30' and against stops 38, provided at the lower ends of the links 29.

In the operation of the device above described, the potato digger is pulled forwardly with the shovels 19 operating below the surface of the soil. During such operation there is a tendency for the trash to be thrown off the sides of the shovels, whereby said trash tends to accumulate between the shovels. The clearing device of this invention is so mounted that the disks 26 are substantially in line with the forward points of the shovels. It has been found that this location is most effective for obtaining the desired results. The lever 36 is adjusted so that the disks penetrate the soil to the desired depth. By means of the springs 37 a yielding pressure may be applied to the disks 26. The lever 36 also serves to lift the center clearing device out of operating position when necessary.

Although we have shown a particular center clearing device for multiple row potato diggers in which disks were utilized, it is to be understood that the use of any clearing or cutting units which will perform the equivalent function, is contemplated. Although a preferred embodiment of the device has been shown, it is to be understood that all modifications are considered as a part of this invention, which fall within the scope of the appended claims.

What is claimed is:

1. The combination with a multiple row potato digger having spaced digger units, of a device for clearing the center between adjacent units comprising a supporting frame floatingly attached to the digger, and trash clearing elements mounted on said frame and positioned to engage the soil between the digger units.

2. The combination with a multiple row potato digger having spaced digger units, of a device for clearing the center between adjacent units comprising a supporting frame floatingly attached to the digger, trash clearing elements mounted on said frame and adapted to engage the soil between the digger units, and means for yieldingly exerting downward pressure against said frame.

3. The combination with a multiple row potato digger having spaced digger units, of a center clearing device which comprises a supporting frame floatingly attached to the digger, and trash clearing diggers rotatively mounted on said frame and positioned to engage the soil between the digger units.

4. The combination with a multiple row potato digger having spaced digger units, of a center clearing device which comprises a supporting frame floatingly attached to the digger, and trash clearing means mounted on said frame, said means consisting of a pair of rotatable disks angularly positioned with their forward edges adjacent each other.

5. The combination with a multiple row potato digger having spaced digger units, of a center clearing device which comprises a supporting frame pivotally attached at its forward end to the digger, means for lifting the rearward end of said frame and for yieldingly exerting downward pressure there against, and trash clearing elements mounted on said frame and adapted to engage the soil between the digger units.

6. The combination as set forth in claim 5, in which the trash clearing elements consist of a pair of disks angularly positioned with their forward edges adjacent each other.

7. The combination with a multiple row potato digger having a supporting frame and spaced digger units attached thereto, of a center clearing device which comprises a supporting frame pivotally attached at its forward end to the digger frame, trash clearing means mounted on said frame and positioned to engage the soil between the digger units, and means connecting the digger frame and the clearing device frame for lifting the rearward end of the clearing device and for yieldingly exerting downward pressure thereagainst.

In testimony whereof we affix our signatures.

LEWIS E. SMITH.
NELSON C. CUDDEBACK.